(12) United States Patent
Lombardini

(10) Patent No.: US 11,426,949 B2
(45) Date of Patent: Aug. 30, 2022

(54) TRANSVERSE CUTTING SYSTEM SUITABLE FOR BEING USED IN A MACHINE FOR THE PRODUCTION OF PLASTIC FILM

(71) Applicant: Colines S.p.A., Novara (IT)

(72) Inventor: Nicola Lombardini, Oleggio (IT)

( * ) Notice: Subject to any disclaimer, the term of this patent is extended or adjusted under 35 U.S.C. 154(b) by 301 days.

(21) Appl. No.: 16/619,967

(22) PCT Filed: Jun. 11, 2018

(86) PCT No.: PCT/EP2018/065275
§ 371 (c)(1),
(2) Date: Dec. 6, 2019

(87) PCT Pub. No.: WO2018/234073
PCT Pub. Date: Dec. 27, 2018

(65) Prior Publication Data
US 2020/0198259 A1 Jun. 25, 2020

(30) Foreign Application Priority Data
Jun. 22, 2017 (IT) .................. 102017000069802

(51) Int. Cl.
*B29C 69/00* (2006.01)
*B26D 1/12* (2006.01)
*B26D 5/20* (2006.01)
*B26F 3/12* (2006.01)
(Continued)

(52) U.S. Cl.
CPC ............ *B29C 69/002* (2013.01); *B26D 1/125* (2013.01); *B26D 1/36* (2013.01); *B26D 5/20* (2013.01);
(Continued)

(58) Field of Classification Search
CPC ...... B26F 3/00; B26F 3/06; B26F 3/08; B26F 3/10; B26F 3/12; B26D 1/125; B26D 1/36; B26D 5/20–28
See application file for complete search history.

(56) References Cited

U.S. PATENT DOCUMENTS 4,683,791 A * 8/1987 Demont .................. B26D 5/22
  83/16
5,335,483 A * 8/1994 Gavronsky ........... B29C 44/182
  53/451
(Continued)

FOREIGN PATENT DOCUMENTS

WO  9958324  11/1999

*Primary Examiner* — Jason Daniel Prone
*Assistant Examiner* — Richard D Crosby, Jr.
(74) *Attorney, Agent, or Firm* — Themis Law

(57) ABSTRACT

A transverse cutting system for a machine for the production of plastic film includes a supporting structure carrying a cutting unit, which are moved between a rest position away from a path of a plastic film being wound and an operating position along the path of the plastic film; a rotating support carrying a hot wire; a rotating cap, associated to an idle roller and arranged transversally to the path of the plastic film that is moving forwards, and an actuator, which controls the rotation of the rotating support carrying the rotating cap and causes the rotating cap to interfere with the plastic film before the hot wire also interferes with said plastic film. The same plastic film, owing to the friction force generated by the rotating cap, entrains it with it, causing the rotating cap to equalize the linear velocity of the plastic film.

12 Claims, 5 Drawing Sheets

(51) Int. Cl.
*B26D 1/36* (2006.01)
*B26D 1/00* (2006.01)

(52) U.S. Cl.
CPC .......... *B26F 3/12* (2013.01); *B26D 2001/008* (2013.01); *B29C 2793/0027* (2013.01)

(56) References Cited

U.S. PATENT DOCUMENTS

| | | | |
|---|---|---|---|
| 6,719,867 B1* | 4/2004 | Mileti | B29C 66/0044 |
| | | | 156/251 |
| 8,554,363 B2* | 10/2013 | Sperry | B31D 5/0073 |
| | | | 700/232 |
| 10,557,520 B2* | 2/2020 | Burgel | F16F 15/328 |
| 10,654,599 B2* | 5/2020 | Campbell | B65B 11/50 |
| 11,135,737 B2* | 10/2021 | Ascone | B26D 5/20 |
| 2002/0090244 A1* | 7/2002 | Wood | B41J 3/4075 |
| | | | 400/621 |
| 2003/0132263 A1* | 7/2003 | Droste | B65H 20/24 |
| | | | 226/10 |
| 2007/0039437 A1* | 2/2007 | Lineberry | B26D 3/006 |
| | | | 83/16 |
| 2007/0039438 A1* | 2/2007 | Lineberry | B26F 3/12 |
| | | | 83/16 |
| 2007/0252298 A1 | 11/2007 | Sperry | |
| 2009/0308965 A1* | 12/2009 | Piucci | B26D 5/20 |
| | | | 242/526 |
| 2010/0139465 A1* | 6/2010 | Christian | A61M 25/0015 |
| | | | 83/23 |
| 2018/0050460 A1* | 2/2018 | Gonzalez Bohme | B26D 3/006 |
| 2019/0270295 A1* | 9/2019 | Nash | B65H 39/06 |

* cited by examiner

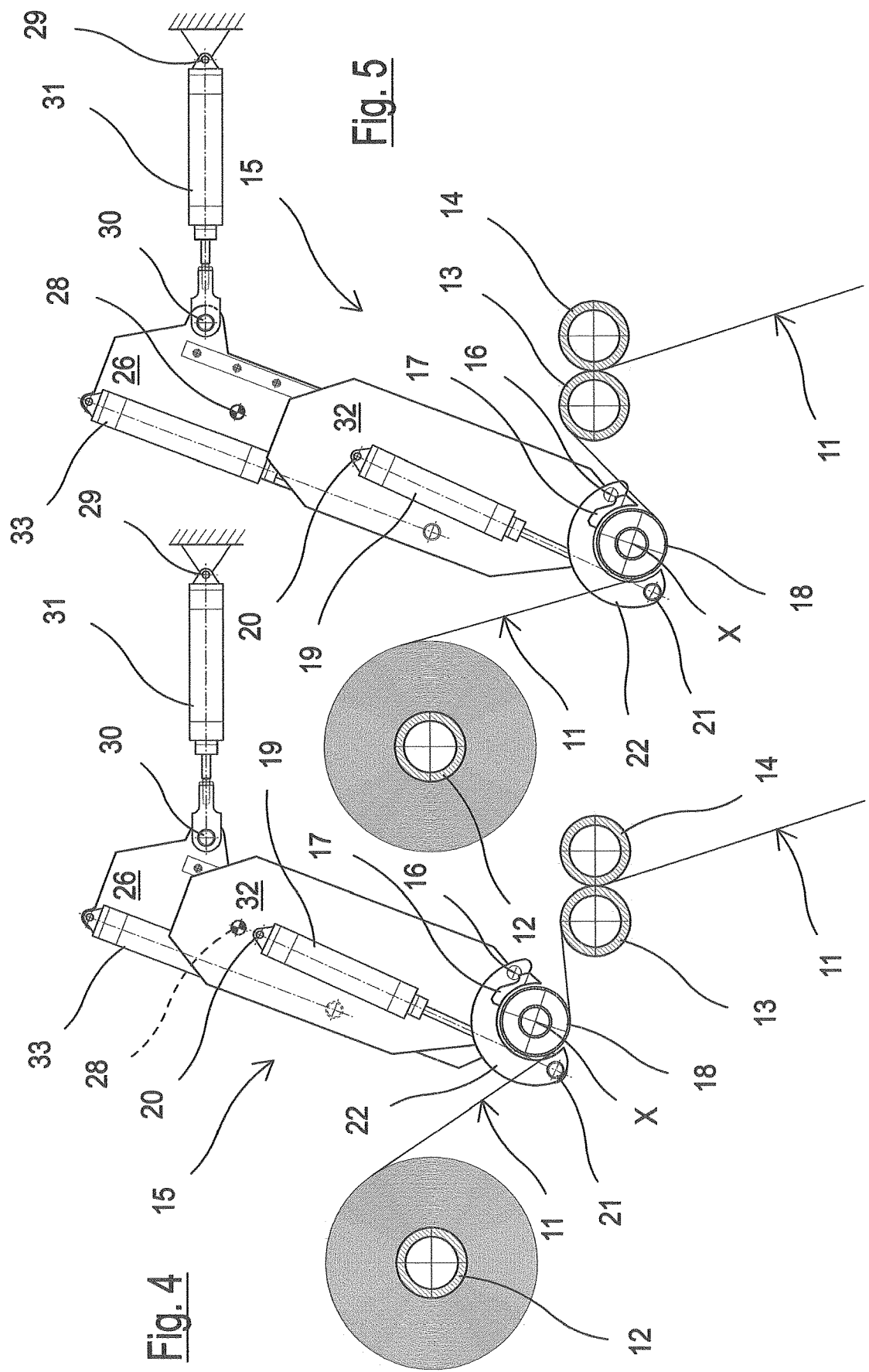

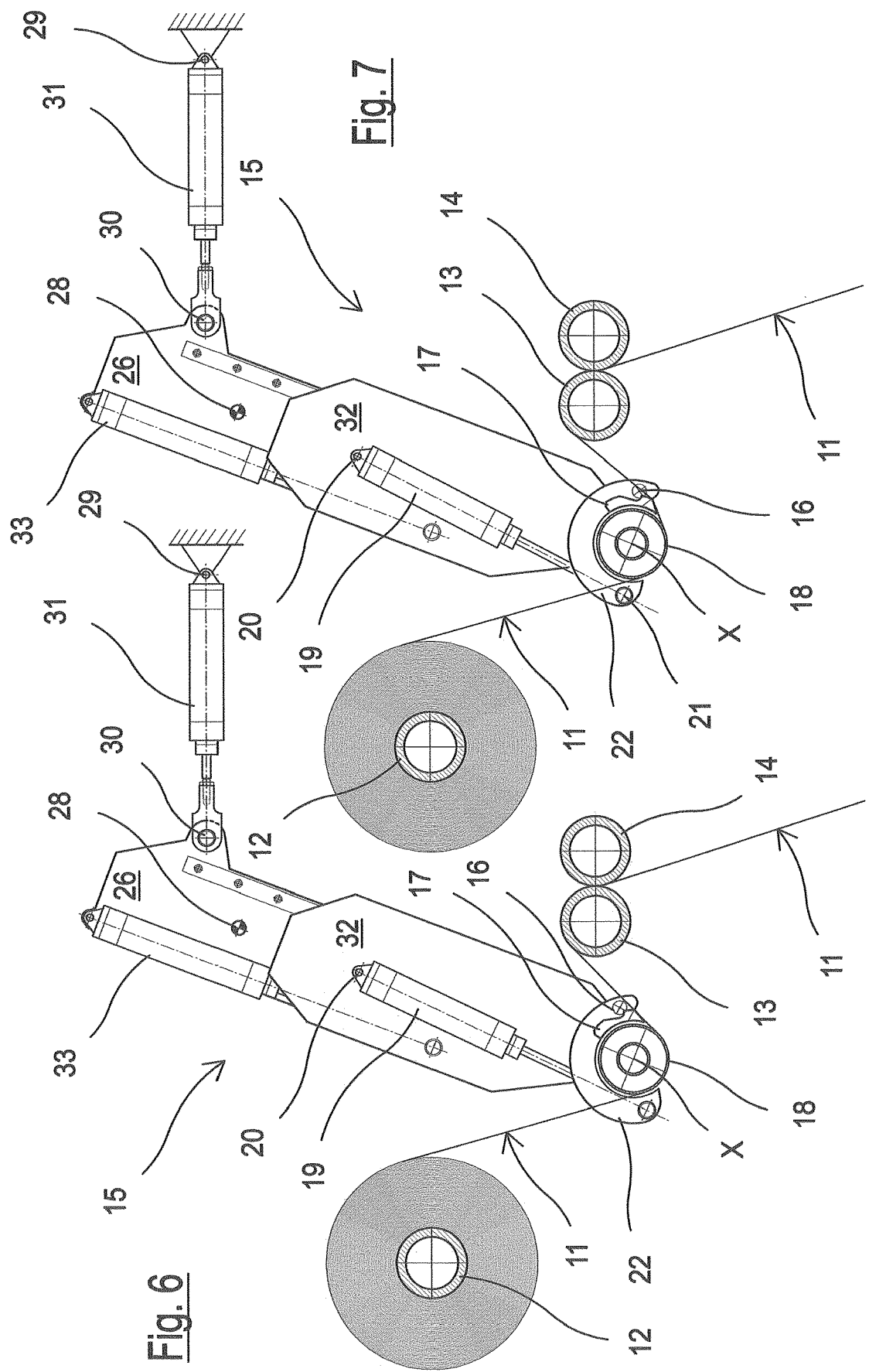

TRANSVERSE CUTTING SYSTEM SUITABLE FOR BEING USED IN A MACHINE FOR THE PRODUCTION OF PLASTIC FILM

FIELD OF THE INVENTION

The present invention relates to a transverse cutting system suitable for being used in a machine for the production of plastic film.

BACKGROUND OF THE INVENTION

In transverse cutting systems between a spool of plastic film in completion and a spool of plastic film in formation, the mechanical resistance characteristics of the plastic film must be taken into account especially in the direction of the machine (hereinafter indicated as MD—machine direction).

The document WO 99/58324 discloses a bag-forming apparatus and method that features a single drive unit for operating both a drive roller and cross-cut mechanism with the drive motor assembly being internalized within the drive roller.

The bag-forming apparatus is designed for feeding, solely through the use of a full film width contact drive roller, film material deriving from a single supply roll of two-ply film material.

The document US 2007/252298 discloses a method and an apparatus for making a foam-in-place cushion in which a foam-forming composition is dispensed between two plastic film portions in a predetermined fashion to selectively control the distribution of the foam in the cushion. A dispersion device can be employed for applying pressure on predetermined areas of the film portions towards each other so as to cause the composition to be redistributed in position in a predetermined manner while the composition is in a less than fully expanded state. The plastic film can then be sealed and closed to form an expanding foam cushion that can be introduced into a shipping carton where the cushion expands to fill void space.

The document U.S. Pat. No. 5,335,483 discloses an apparatus and a method for successively forming foam-filled cushions for packaging purposes of the type in which a bag containing foam precursors is added to a container so that, as the foam precursors form foam, the bag forms a custom cushion adjacent to objects in the container.

In the field of the production of plastic films of any type, various solutions are used for the transverse cutting of the plastic film, whatever type this may be. This cutting can generally be entrusted to the mechanical tearing and cutting action of a cutting element, provided with an inciding movement with respect to the external surface, generating a so-called "guillotine cut". Alternatively, the cutting element moves with respect to the side section, in a direction transverse to the motion of the film causing a so-called "crossing cut".

The first solution is mainly used in cases in which the simultaneous winding of various spools on the same winding axis is required. This is because the cutting of these spools is carried out contemporaneously, thus ensuring the same length of all the rolls wound regardless of the speed of the line.

A limit of this first known solution lies in the fact that the film, especially if the thickness or mechanical resistance MD is very high, must be significantly pre-stressed so as to avoid the "bouncing" of the same during the cutting action.

Any plastic film is in fact provided with dual behaviour. The film has a first elastic phase, in which the relative elongation value is directly proportional to the force applied according to Hooke's law $\varepsilon=\sigma/E$, wherein E is the so-called Young modulus, characteristic of the material. After exceeding a characteristic tension value, called "yield", the material passes to the plastic phase. In the plastic phase the direct proportionality between tension and elongation no longer exists and the deformations induced to the material become permanent. In this case the material does not resume its original size, once the supply of the above-mentioned tension has ceased, contrary to the case of the elastic behavior.

The presence, in this specific case, of an elastic behavior of the film means that it is necessary to apply an amount of energy sufficient for passing this phase in only one step, enervating and subsequently breaking the molecular chains in a time measurable in hundredths, if not thousandths of a second.

Now, since energy is measured in J, $N*m$, it follows that in order to provide what is needed in a very short time, the power used, or $W=J/s$, must be extremely high. This power in turn increases linearly with Young's modulus of the material being cut. Consequently, for particularly "tough" films, there is the risk of having to apply powers that are not compatible with the common known art.

In this case, the power is obviously related to the need for reaching extremely high "impact" rates of the cutting element against the film, so as to have a sufficient momentum ($=m*v$) without having to excessively increase the mass of the system. This increase in fact would create further problems relating to both inertia and above all to the practical implementation of the cutting element.

With excessively low powers, in fact, there is the risk of remaining in the elastic phase of the film, failing to reach and exceed the yield limit and the subsequent breaking load: which is the premise of the failure to cut the film.

It is therefore not advantageous to use a high value of kinetic energy (difficult to control), to impress the cutting element with the correct power for cutting the film.

In the case of the so-called "crossing" cut, there is the great advantage offered by the possibility (or rather, by the necessity) of carrying out the complete cutting of the film in an extremely longer time. This cutting time is in fact equal to the crossing time of the blade in a direction transverse to the motion of the film itself.

Although referring to applications of particularly narrow lines (for reasons of industrial convenience, however, it is difficult to have useful widths of less than 1000 mm), the time values involved are at least two orders of magnitude higher than the previous case. The required power is consequently two orders of magnitude lower.

The greatest problem of this second solution (which might therefore seem to be the right solution to the problem initially raised), is that in the case of productions of a plurality of rolls simultaneously on the same axis, the cutting lengths of the various rolls are not the same. With this solution, in fact, the time connected with the crossing of the blade along the transversal of the film must be taken into account or "considered". And of course, this defect is all the more evident the wider the line.

SUMMARY OF THE INVENTION

The general objective of the present invention is to provide a transverse cutting system capable of solving the above-mentioned drawbacks of the known art in an extremely simple, economical and particularly functional manner.

A further objective of the present invention is to provide a transverse cutting system which does not require the necessity of applying high powers (and therefore masses and velocities) for effecting a good cutting of the plastic film. An objective of the invention is therefore to avoid using a high kinetic energy value for imparting the correct power to the cutting element for effecting the cutting of the film.

Another objective of the present invention is to identify a transverse cutting system using a metal wire to which sufficient thermal power can be applied for bringing the metal wire to temperature, even with a wire having an extremely reduced mass, and also to manage the cutting with the use of electric powers within acceptable limits.

The above objectives are achieved by a transverse cutting system obtained according to the independent claim 1 and the following subordinate claims.

BRIEF DESCRIPTION OF THE DRAWINGS

The structural and functional characteristics of the present invention and its advantages with respect to the known art will appear even more evident from the following description, referring to the enclosed schematic drawings, which show an embodiment example of the invention itself. In the drawings:

FIGS. 4 to 7 show a series of consecutive steps of the transverse cutting system and method according to the invention.

DETAILED DESCRIPTION OF EMBODIMENTS OF THE INVENTION

With reference to the figures, these show a hot-wire transverse cutting system for plastic films, for example with a high longitudinal resistance, according to the invention, suitable for being applied in machines for the production of any type of plastic film. In this specific case, the transverse cutting system is specifically suitable for the production of particularly tough plastic film.

Within a machine for the production of plastic film, the cutting system is as follows.

A plastic film 11 arrives from a production head (not shown) to be wound onto a first reel 12 and create a finished spool.

When this spool must be terminated at the end of the formation, the transverse cutting of the plastic film 11 must be effected.

At the same time, automatically, a flap of the plastic film as the initial part of a new spool must be provided on a second reel 13 to ensure that the machine for the production of plastic film is not stopped. After this, with a rotating head assembly or other system, the finished spool is discharged from the first reel 12 and the new spool is wound onto the second reel 13. There can of course be more than two reels, without changing the cutting system.

In the exemplary representation of this transverse cutting system, a contact cylinder 14 can also be provided, which collaborates with said second reel 13, which, however, may also not be present. Its presence, in fact, depends on the type of winding provided. The winding can be with a motorized reel, or free and entrained specifically with a motorized contact cylinder, or as in the case illustrated, motorized, but in any case pressed by a free contact cylinder, of any shape or form.

Figure 1:
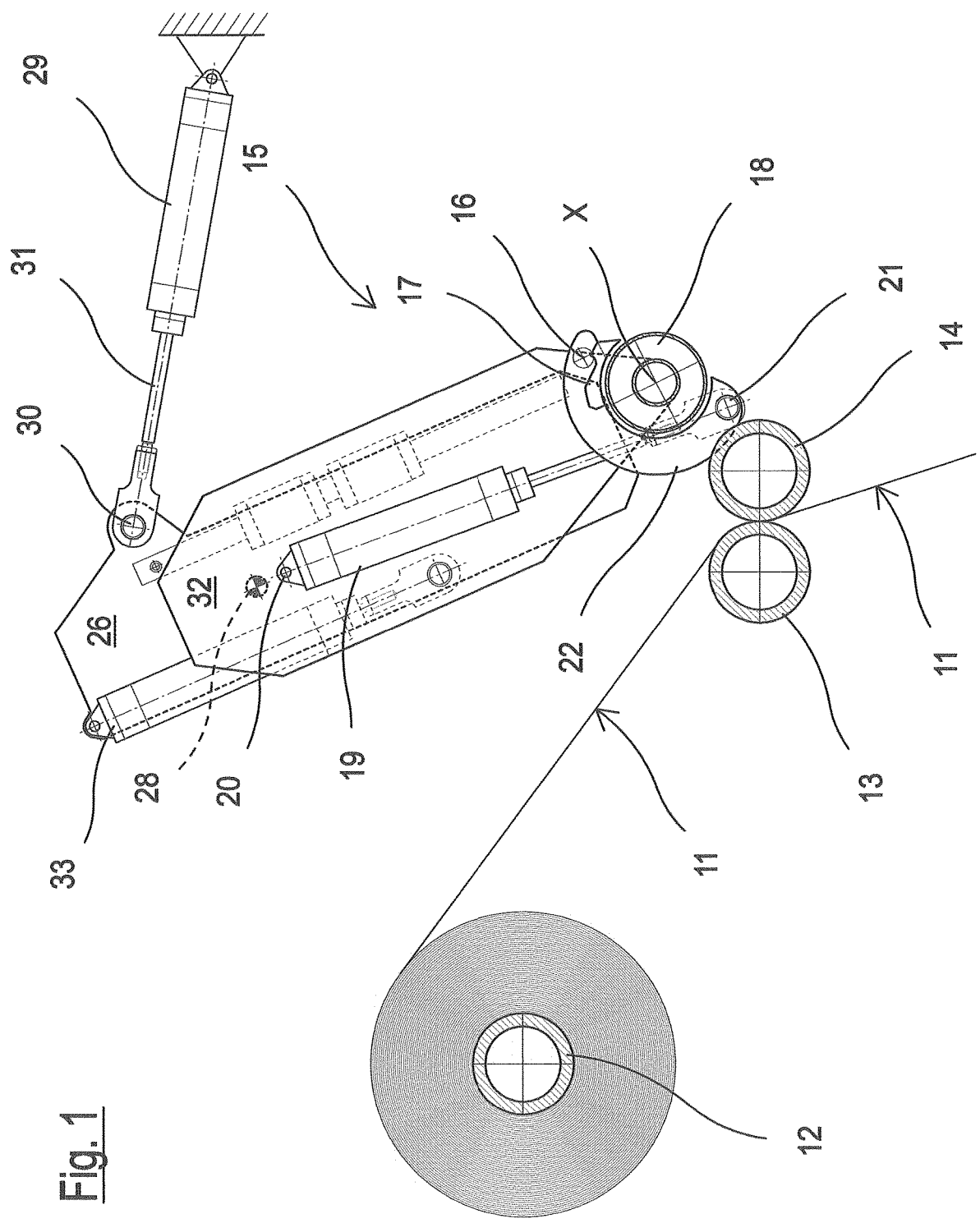
FIG. 1 is a raised sectional side view illustrating a transverse cutting system according to the invention in a first position preceding the cutting action.
Figure 2:
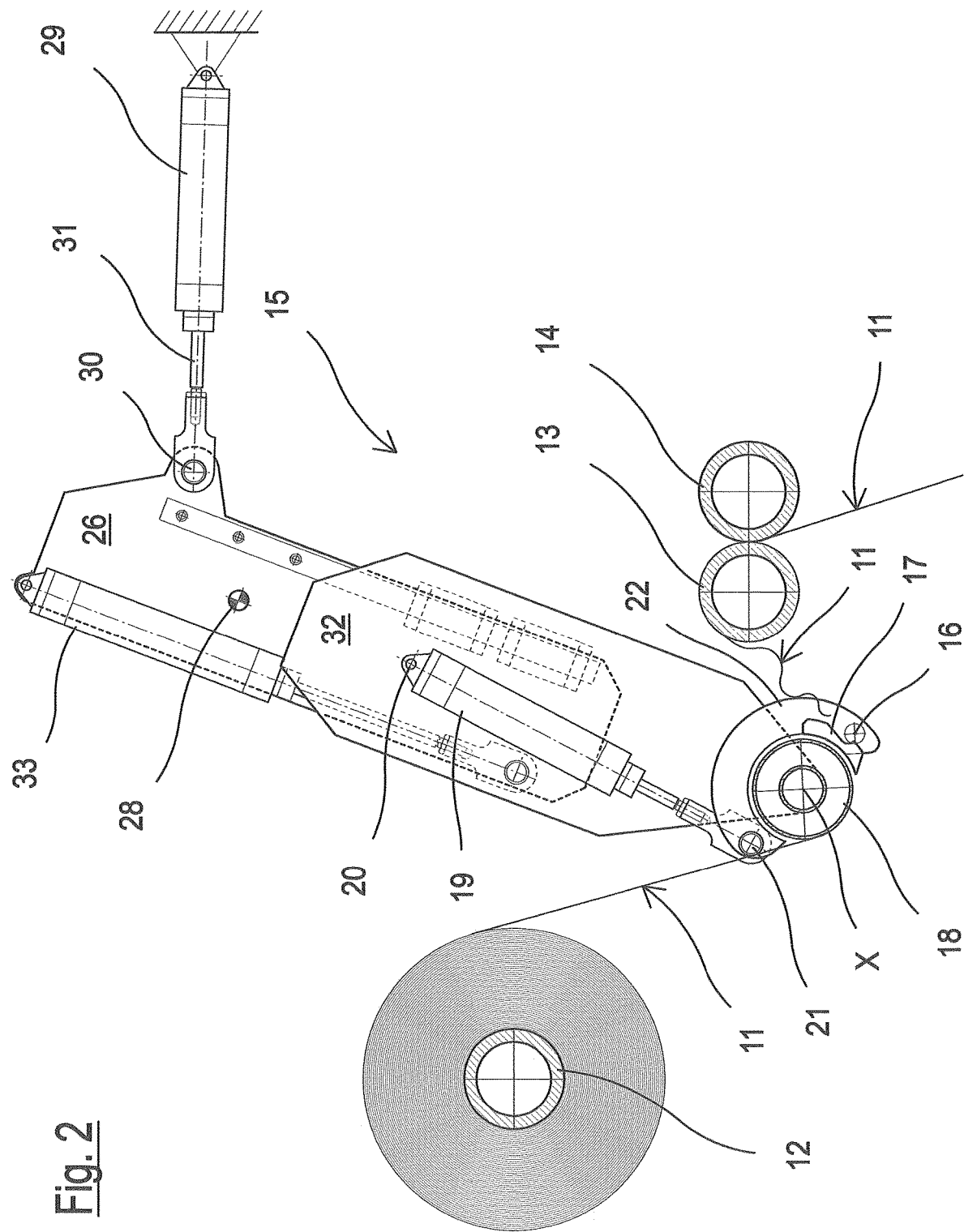
FIG. 2 is a raised sectional side view of the transverse cutting system according to the invention of FIG. 1 in a final position in which the cutting action is effected.

FIGS. 1 and 2 show that a cutting unit 15 is positioned between the two reels 12 and 13 to be able to intervene on the plastic film 11 being wound.

Said cutting unit 15 is supported on a supporting structure 26, said structure 26 being hinged for example in 28 to a frame of a machine (not shown). The supporting structure 26 is moved between a rest position disengaged from the plastic film and an operating position in engagement along a path of the plastic film 11 being wound. This movement is generated by an actuator 29 which can be pneumatic, electric, hydraulic or of any other type. The example illustrated shows a cylinder 29 hinged on one side to the frame of the machine and on the other side hinged in 30 with its rod 31 to the supporting structure 26. During the normal winding action of the plastic film, the structure 26 carrying the cutting unit 15 is usually kept away from the path of the plastic film (FIG. 1) in a rest position in the machine for the production of plastic film.

Said cutting unit 15 is positioned on a slider 32 movable with respect to the structure 26 to act on the plastic film 11 by means of an actuator 33, such as a cylinder, integral at one end with the supporting structure 26.

The cutting unit 15 comprises a hot wire 16 and a rotating cap 17, associated with an idle roller 18, free to rotate, all three transversal with respect to the path of the plastic film 11 that is moving forwards.

In the example, the hot wire 16 is preferably, but not exclusively, composed of a Ni—Cr alloy, and is fixed to the rotating cap 17. The cap 17, preferably but not exclusively, rotates around the same rotation axis X as the idle roller 18.

Figure 3:
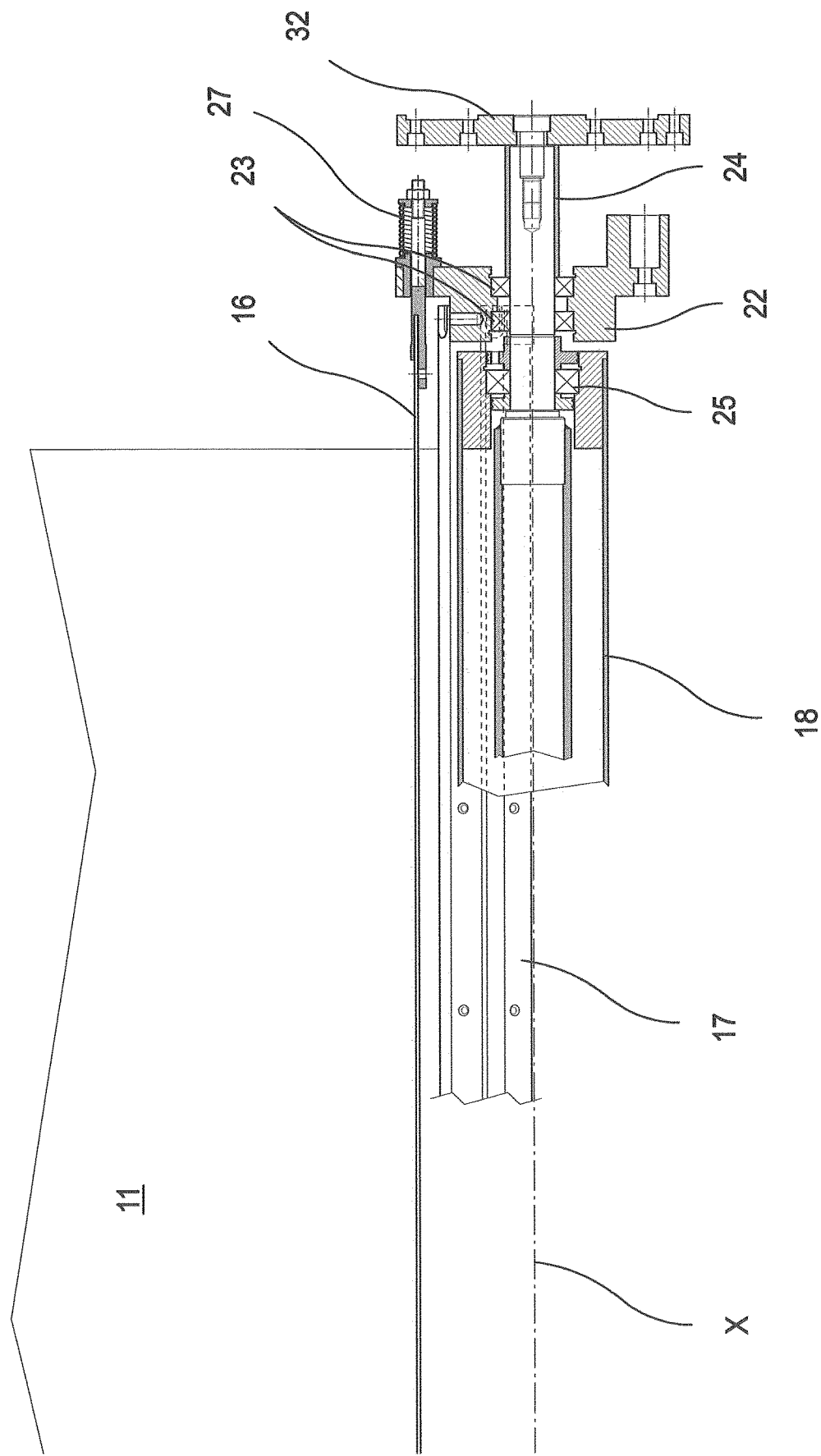
FIG. 3 is a section partially obtained as shown in FIGS. 1 and 2.

A further cylinder 19, preferably but not exclusively pneumatic, acts as an actuator for controlling the rotation of the above-mentioned cap 17 around the rotation axis X of the idle roller 18. In particular, said cylinder 19 is fixed by means of a pin 20 at one of its ends with respect to the slider 32 of the cutting unit 15 whereas at the opposite end, it is integral by means of a pin 21 to a support 22 of the cap 17. The support 22, by means of bearings (23), is free to rotate with respect to a shaft 24 integral and cantilevered with respect to the slider 32 of the cutting unit 15. Furthermore, as shown in FIG. 3, the idle roller 18 is also supported, by means of bearings 25, with respect to said shaft 24.

It should be noted that the cap 17 and the hot wire are arranged on the support 22 so that when the support 22 rotates, they become engaged on the plastic film 11 one after the other.

With respect to the figures, it can be observed that FIG. 1 represents the system in a phase preceding the cutting action, in which the actual winding of the plastic film onto the first reel 12 is in progress in the machine for the production of plastic film. In this step, the hot wire 16 is not yet affected by contact with the plastic film 11 and even the whole cutting unit 15 is disengaged through the cylinder 29 whose rod 31 is completely extracted.

During a subsequent step, the cylinder 29 withdraws its rod 31 and causes the supporting structure 26 to rotate with respect to the pin 28 (FIG. 4).

In this way, the cutting unit 15 is brought to a position detached from the film but almost ready for effecting the cutting, with the idle roller 18 which is engaged on the plastic film being wound.

At this point, in a further step, the cylinder 33 extends its rod and causes the slider 32 to move with respect to the supporting structure 26 (FIG. 5).

The idle roller 18, however, allows the plastic film 11 to be unwound without any problem and at the same time, the cutting unit 15 is ready to intervene.

In an immediately subsequent step, the cylinder 19 on the slider 32 withdraws its rod and determines the start of the rotation of the support 22 of the cap 17 (and hot wire 16) (FIG. 6).

In this way, the cylinder 19, withdrawing its rod, imparts a first acceleration to the cap 17, without using a high amount of energy. This takes place thanks to both the relative lightness of the parts (preferably but not exclusively composed and made of light alloy, such as aluminium) and the lack of the need for applying a considerable force.

This means that it is the same plastic film 11 which, engaging on the cap 17, entrains the support 22 of the cap 17 (and of the hot wire 16) in rotation, without the hot wire 16 still being engaged on the plastic film 11 itself.

It has in fact been found that it is important and essential to avoid any rubbing (i.e. an excessive difference in relative speed) as much as possible, between the hot wire 16 and the plastic film 11 in motion. It should be remembered that plants for the production of plastic film in which this new inventive system finds its correct application, have a linear rate of the plastic film 11 which can even reach 300 m/min. It is therefore important to avoid having an external system which imparts this rate to the supporting element (cap 17 and support 22) of the hot wire itself 16 in a few hundredths, not to mention thousandths, of a second.

This system would re-create the problem indicated of the excess of kinetic energy detected in the case of the traditional and well-known guillotine cutting system.

It can therefore be seen that in order to overcome this problem, the present invention has identified the use of the same kinetic energy possessed by the plastic film 11, "discharging" part of it on the rotating movement unit of the supporting element which sustains the hot wire 16.

The rotation of the cap 17 in engagement on the plastic film 11 immediately leads to an engagement of the hot wire 16 on the plastic film 11 (FIG. 7).

And the plastic film 11 is immediately cut as shown in FIG. 2.

According to the invention, a new method for the transverse cutting of plastic film is therefore also identified, in which new and inventive steps are provided between the usual steps relating to the rest position of the cutting element and the engagement position of the cutting element on plastic film to be cut.

In this case, in fact, a first step in which the cap 17 and hot wire 16 of the cutting unit 15 are in a rest position, disengaged from the plastic film, is certainly present.

This is followed by an activation step of the cutting unit 15 when the spool on the first reel 12 is becoming complete. Consequently, the machine for producing the plastic film must be arranged so as to effect the transverse cutting of the plastic film 11, by completing the spool on the first reel 12, thus creating a tail flap. At the same time, an initial flap of the plastic film must be provided, automatically, for a new spool and this initial flap then arranged on a second reel 13. All this naturally with the high processing rates indicated above.

In the example illustrated, as soon as the cap 17 comes into contact with the plastic film 11, it is the same plastic film 11 which, thanks to the friction force thus generated, entrains the cap 17 with it, bringing it to equalize the linear velocity of the plastic film 11.

At this point, the difference in the relative speed of the hot wire 16 with respect to the plastic film 11 at the moment of contact is null or in any case not significant. In this way, the relative rubbing between the plastic film and the hot wire and the excessive removal of heat by the same plastic film 11, is avoided.

Immediately after this contact, in fact, there is a phase in which the hot wire 16 of the cutting unit 15 comes into contact with said plastic film and cuts it.

As can be clearly seen, FIG. 2 shows the final position of the cap 17, which however is able to stop thanks to the maximum run of the rod of the cylinder 19.

As is well known, heating a metal wire 16 to high temperatures leads to a relative elongation of the same due to the well-known physical phenomenon of thermal expansion. It should be pointed out that the temperatures can reach very high values, given the need to provide the plastic film 11 with the correct amount of heat in the reduced time mentioned above.

As the metal wire 16 has a markedly preponderant dimension with respect to the other two, it can be effectively assimilated to a line, thus avoiding considering it in a three-dimensional context.

As the Vicat temperatures of the plastic materials commonly used on extrusion and filming lines have extremely variable values, but can also reach 200° C., and considering the low thermal transmissibility of plastic materials, it is obvious that the actual temperature that the metallic wire 16 must reach must be far higher than that indicated above.

Reasoning in this way (conservative), an operating temperature of the hot wire 16 even higher than 500-F600° C. can be assumed. This implies expansions even higher than a few tens of millimeters for production lines of plastic film with useful widths in the order of 2-3 meters.

In order to maintain an appropriate tension of the hot wire 16, even if subjected to these high deformations, a pre-tensioning system has been applied in the cutting unit, by means of a return spring 27, positioned at an end of the wire 16, as can be seen in FIG. 3.

The possibility of regulating the pre-tensioning of the hot wire 16 manually or with any other system, also automated, is necessary in the case of temperature changes. The temperature reached by the hot wire 16 is in fact defined on the basis of the type of plastic material to be cut.

The very type of wire 16, or the material of which it is made, must be chosen congruently with the maximum temperatures that must be reached. The relative thermal deformations and the consequent sizing of the spring 27 or of the pre-tensioning system which is intended to be used for the purpose, may therefore be subject to even substantial variations, without prejudice to the concept of maintaining the correct tension of the hot wire 16 to avoid excessive buckling at the time of contact with the plastic film.

It can therefore be seen how the invention overcomes the congenital defects of the solutions still present on the market, by introducing the use of a metal wire brought to a temperature which is such as to induce the almost instantaneous melting of the plastic film. This eliminates any necessity of applying high powers (and therefore masses and velocities). It is evident in fact that the elastic modulus of any plastic material exponentially decreases when subjected to temperatures close to its Vicat value, or its melting point.

A sufficient thermal power is obviously necessary for bringing the wire to temperature, but having the possibility of using wires with extremely low masses and with a careful selection of the material of which it is made and with a high heat-exchange coefficient, these operations can be managed with the use of electric powers within more than acceptable limits.

The present invention therefore uses, instead of a high kinetic energy value (difficult to control), in order to impart the correct power to the cutting element for effecting the cutting of the film, a much more manageable "X" value of thermal power, deriving from heating through the Joule effect of a metal wire. It also uses an approach system to the film which is inherently similar to the so-called "guillotine" cut, but with some substantial differences previously described.

As can be seen, according to this invention, the moment of contact is reached between the hot wire 16 and the plastic film 11 with the correct temperature, avoiding rubbing between wire and film. Furthermore, the reduced mass of the hot wire 16, advantageous for not requiring excessively high temperatures, would cause the premature cooling of the same, thus inhibiting the cutting action.

With respect to the possibility of determining the correct heating temperature, a possible solution (but certainly not the only one) consists of the use of a rheostat. This provision gives the possibility of modulating the power supplied to the wire (i.e. the current value) according to necessity. The latter can vary mainly according to the velocity of the film production line, the mechanical characteristics of the film in terms of breaking load and, last but not least, the thermal characteristics of the film in question.

Numerous other solutions for varying the temperature of the wire are obviously possible, starting from a timed start of the power supply, or a more refined control with a temperature detection probe embedded in the wire itself, or even through an external IR probe that determines the specific temperature, and many others.

The structural and functional forms for the provision of a system and implementation of a cutting method of the invention, as also the materials and assembly modes, can naturally differ from those shown by way of non-limiting example in the drawings.

The objective mentioned in the preamble of the description has therefore been achieved.

The protection scope of the present invention is defined by the enclosed claims.

The invention claimed is:

1. A transverse cutting system suitable for being used in a machine for production of plastic film, comprising:
   a supporting structure (26) carrying a cutting unit (15), the supporting structure and the cutting unit moving between a rest position away from a path of a plastic film (11) being wound and an operating position along said path of the plastic film;
   a rotating support (22) carrying a hot wire (16);
   a rotating cap (17), associated with an idle roller (18), arranged transversally with respect to the path of the plastic film (11) that is moving forwards, and
   an actuator (19), which controls a rotation of said rotating support (22) carrying said rotating cap (17) and causes said rotating cap (17) to interfere with said plastic film (11) before said hot wire (16) also interferes with said plastic film (11),
   wherein the plastic film (11) entrains said rotating cap due to a friction between said plastic film (11) and said rotating cap (17), so as to cause said rotating cap (17) to rotate at a velocity equal to a linear velocity of the plastic film (11).

2. The transverse cutting system according to claim 1, wherein said cutting unit (15) is positioned on a slider (32) caused to move with respect to said supporting structure (26) by an actuator (33).

3. The transverse cutting system according to claim 1, wherein said supporting structure (26) is hinged to a frame of said machine for the production of plastic film and is configured to be moved by an actuator (29) between a rest position disengaged from the plastic film and an operating position engaged along the path of the plastic film (11) that is being wound between a first and a second reel of said machine.

4. The transverse cutting system according to claim 3, further comprising a contact cylinder (14), collaborating with the second reel (13), the plastic film (11) being wound onto the first reel (12).

5. The transverse cutting system according to claim 1, wherein said rotating cap (17) and said hot wire (16) are positioned on the rotating support (22) so that, with a rotation of the rotating support (22), said rotating cap and said hot wire become engaged with the plastic film (11) one after the other.

6. The transverse cutting system according to claim 1, wherein said rotating support (22), due to first bearings (23), is free to rotate with respect to a shaft (24) integral and cantilevered with respect to said supporting structure (26, 32) of the cutting unit (15).

7. The transverse cutting system according to claim 6, wherein said idle roller (18) is supported by second bearings (25) with respect to said shaft (24).

8. The transverse cutting system according to claim 1, wherein said rotating support (22), said rotating cap (17), and said idle roller (18) are made of a light alloy.

9. The transverse cutting system according to claim 1, wherein said hot wire (16) is comprises a Ni—Cr alloy.

10. The transverse cutting system according to claim 1, wherein said hot wire (16) is kept in an appropriate tension, at all operating temperatures, by a pre-tensioning system defined by a return spring (27).

11. A transverse cutting method suitable for being used in a machine for production of plastic film, a cutting unit (15) being positioned in said machine, said cutting unit comprising a cap (17), a hot wire (16), and an idle roller (18), arranged transversally with respect to a path of the plastic film (11) which is moving forwards, wherein said cutting unit (15) is moved between a rest position disengaged from the plastic film and a positioned engaged with the plastic film to be cut, said method comprising:
   causing said cap (17) and said hot wire (16) of the cutting unit (15) to be in a rest position disengaged from the plastic film;
   activating the cutting unit (15) when a spool of the plastic film on a first reel (12) is being completed;
   causing the plastic film, as soon as said cap (17) comes into contact with the plastic film (11), to entrain said cap due to a friction between said cap (17) and said plastic film (11), thereby causing said cap (17) to rotate at a velocity equal to a linear velocity of the plastic film (11); and
   causing said hot wire (16) of the cutting unit (15) to enter into contact with said plastic film and to cut said plastic film.

12. The transverse cutting method according to claim 11, wherein activating the cutting unit (15) comprises moving said cap (17) and said hot wire (16) of the cutting unit (15) between a rest position disengaged from the plastic film and a position in which said idle roller (18) is engaged with said plastic film (11).

\* \* \* \* \*